P. FELIX.
MULTICYLINDER ENGINE.
APPLICATION FILED DEC. 8, 1916.

1,276,891.

Patented Aug. 27, 1918.
3 SHEETS—SHEET 1.

Witnesses:
J. H. Crawford
N. Collamer

Inventor
Paul Felix,
By Victor J. Evans
Attorney

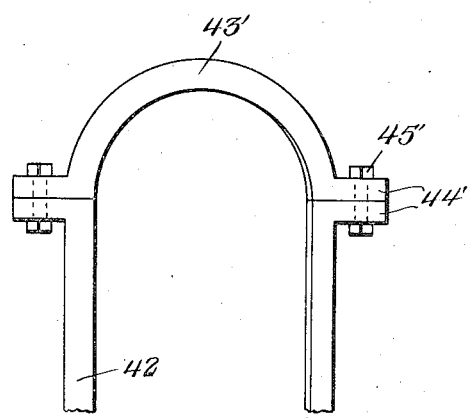
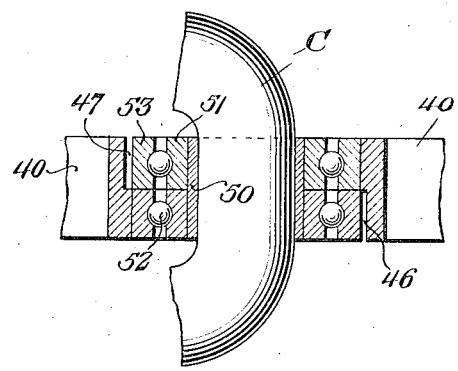
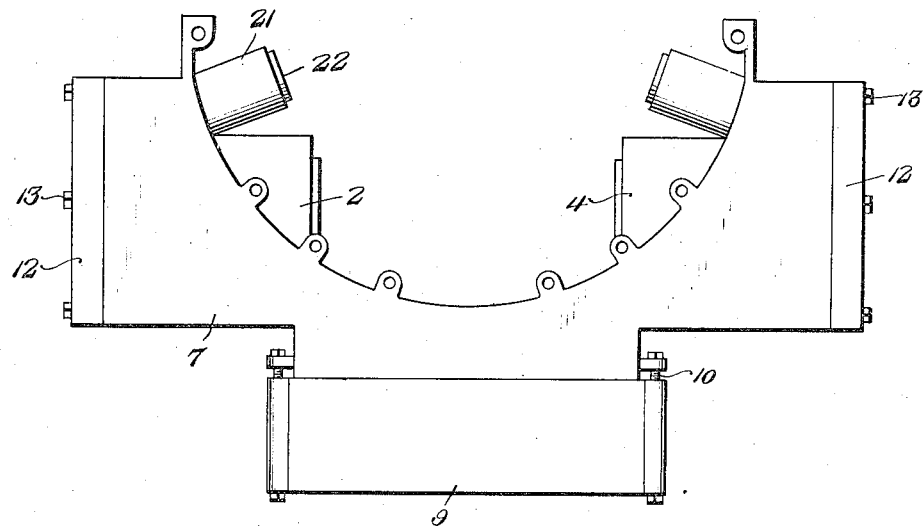

UNITED STATES PATENT OFFICE.

PAUL FELIX, OF KNOXVILLE, TENNESSEE.

MULTICYLINDER ENGINE.

1,276,891.   Specification of Letters Patent.   Patented Aug. 27, 1918.

Application filed December 8, 1916. Serial No. 135,843.

*To all whom it may concern:*

Be it known that I, PAUL FELIX, a citizen of the United States, residing at Knoxville, in the county of Knox and State of Tennessee, have invented new and useful Improvements in Multicylinder Engines, of which the following is a specification.

This invention relates to internal combustion engines, and more especially to those having opposed cylinders; and the objects of the same are to eliminate the conventional connecting rods, to permit of the casting of the cylinders en bloc with the crank case, to provide a special structure whereby the two cam shafts and the crank shaft may be bodily removed, to protect the shafts and the valves and pistons within a single housing and lubricate them automatically, to provide a special mounting for the roller bearings between the pistons and the cranks, and generally to simplify construction, reduce friction and increase power. These and other objects will be accomplished by the construction hereinafter more fully described and claimed, and as shown in the drawings wherein—

Figure 3:
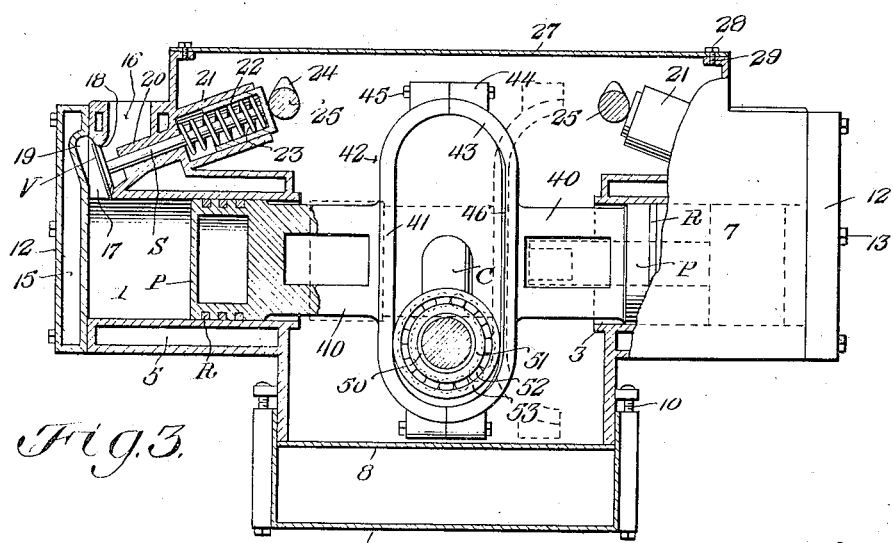
Fig. 3 is a vertical section with the cover in place, being taken on about the line 3—3 of Fig. 1.

In the accompanying drawings is shown my invention as applied to a four-cylinder engine, although of course it will be understood that I am not limited in this respect. Also the cylinders are shown as water-jacketed, each with an inlet and an outlet valve whose details of construction are not important, and I have purposely omitted other features not involved in this invention as, for instance, the ignition system, the timing system, the carbureter, etc. One casting in the present instance is made to include the four cylinders 1, 2, 3, 4 and their water jackets 5; and the cut out end plates 6 and 7 are attached to the crank casing. The bottom of the latter may be closed by an integral plate or by a separate bottom plate as shown at 8 in Fig. 3, and there may be a subjacent pan 9 adjustably supported as by screws 10 engaging lugs. The outer ends of the cylinders are closed by heads 12 preferably having their own jackets 15, and these heads are held removably in place by screws 13. The casting also contains valve chambers 16, each communicating by means of a port 17 with its own cylinder and having its own seat 18 which is preferably inclined as explained below, the inner jacket wall of the head plate 12 being indented as at 19 to give free movement to the valve heads V. The casting is also formed with a tubular guide or boss 20 standing at about twenty degrees above a horizontal and through which passes the valve stem S. The casting also carries, or it may be formed integral with, a spring chamber 21 which stands coaxial with the boss 20 and into which the stem S projects. Said stem at its inner end is provided with any suitable form of head or cap 22, and a coiled expansive spring 23 surrounds the stem between this cap and the lower end of the chamber for holding the head of the valve V normally against its seat 18 as usual. The cam 24 on the cam shaft 25 bears against the cap 22—all as best seen in Fig. 3, but I do not consider it necessary to illustrate or describe the inlet manifold or the exhaust manifold. The charge is supplied to the inlet valve and the burnt gases taken from the outlet valve in any suitable manner forming no part of the present invention. Within each cylinder reciprocates a piston P having the usual rings R. The cylinders in the present case are arranged in pairs, opposed to each other, numbers 1 and 3 being opposite and alined with each other and numbers 2 and 4 opposite and alined. Between them stands the main shaft M which in the present case is shown as provided with two cranks C. The open top of the crank casing (which latter is shaped to include the parts already described) is closed by a cover plate 27 held removably in place by screws 28 engaging holes 29 in the shell of said casting, or in any other appropriate manner.

Figure 1:
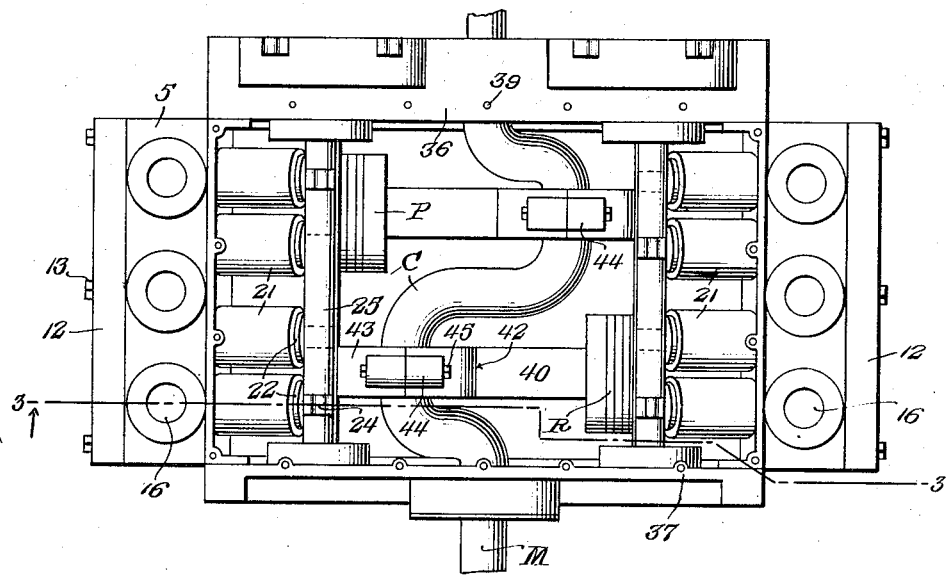
Figure 1 is a plan view of this engine with the cover removed.
Figure 4:
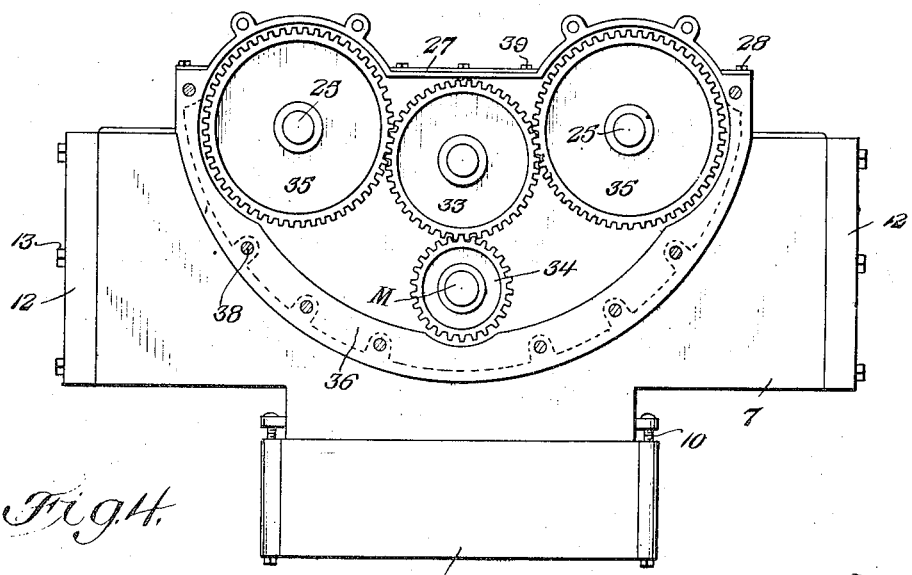
Fig. 4 is an end view of the entire structure, Fig. 5 an end view of the main casting, Fig. 6 an enlarged detail of a slight amplification, and Fig. 7 a horizontal section through the bearing for one of the cranks.
Figure 2:
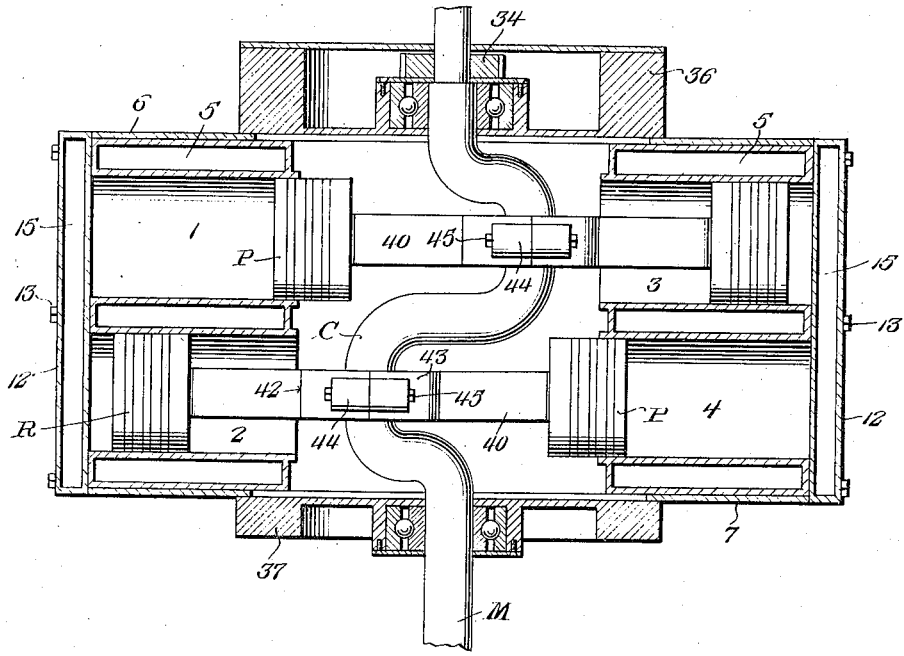
Fig. 2 is a horizontal section.

One important feature of my invention is the removability of the main shaft and the two cam shafts, without disturbing other elements, and this is accomplished as follows: There are two removable end plates 36 and 37 bolted at 38 respectively to and complementing the end plates 6 and 7, and at 39 to the ends of the cover plate, and each removable end plate has bearings for the three shafts mentioned, the cam shafts having gears 35 beyond one end plate, the main shaft having a half sized gear 34, and an idle gear 33 connecting them as best seen in Fig. 4. Thus it will be seen that, when the cover plate is removed and the end plates 36 and 37 detached from the main casting, said plates and shafts may be lifted entirely out of the main casting in a manner which will be made clear below, and then, by first removing the gears, the plates and their bearings can be slipped off from the extremities of the shafts. Also by a reversal of the operation, the parts can be quickly restored to their original position after repairs have been made.

Another important feature of my invention is the specific means employed for communicating the reciprocating motion of opposed pistons to the cranks of the main shaft, resulting in rotary motion of the latter, while doing away with the usual connecting rods and this is accomplished as follows: The stems 40 of each pair of pistons are carried inward and respectively connected (preferably integrally) with the heads of sides 41 or an upright yoke 42 of loop or oval shape which stands midway between the two piston heads P. The upper and lower ends of the sides 41 are by preference arched toward each other as at 43 and provided with external lugs 44 detachably connected by means of bolts 45; and one-half of the inner face of one side is cut away or recessed as seen at 46 on Fig. 7, while the other half of the opposite side is cut away or recessed as at 47, for a purpose yet to be described.

Around the crank C is preferably shrunk a sleeve or collar 50, around this in turn and standing side by side are closely fitted channeled rings constituting the inner races or members 51 of two roller or ball bearings, next outside these members are the balls 52, and next outside the balls are the channeled rings constituting other races or members 53; and by reason of the cutaway portions or recesses 46 and 47, these outer members have each a certain clearance within one side of the yoke 42. That is to say, the left side 41 of the yoke on the piston within cylinder 1 forms a track which contacts closely with the outer member 53 of its roller bearing, whereas the right side has a clearance as at 47, and the reverse is true of the piston within the opposite cylinder. The result is that, during the operation of the engine, the turning of the main shaft M causes the rotation of the crank C; the latter carries with it the sleeve or collar 50 and the inner member 51 of the bearing, the balls or rollers 52 therein move at half speed, and the outer member 53 rises and falls within the yoke, but it serves as a wheel and rolls as it travels up and down in contact with the track at the left side 41 thereof whereas the right side of the yoke by reason of the clearance 47 is out of contact with the right side of such wheel 53 to permit its rolling. It is to be understood that the parts are all lubricated by a splash system, because the casing contains a volume of oil which is kept in constant agitation by the reciprocating movements of the pistons and the yokes and the rotary movement of the cranks, with the result that the pistons are well oiled where they reciprocate within their cylinders, the cranks and the bearings where they move within their yokes, the valve stems and caps where they move within their guides and chambers, and the cams where they contact with said caps,—therefore no additional system of lubrication is necessary.

In Fig. 6 I have illustrated a slight amplification, which consists in closing the upper end of each yoke 42 by a semi-circular arched member 43', connecting the latter by lugs 44' and bolts 45' with the upper ends of the straight upright sides 41, instead of across the tops of the arch as best seen in Fig. 3. When these arches 43' are removed it is obvious that the crank shaft may be lifted out of the yokes without disconnecting the sides of the latter at the bottom. This amplified construction may be used although it involves an additional bolt and additional parts, but I do not wish to be limited in this respect.

The operation of engines of this kind is too well understood to need a detailed description here. The construction which I have illustrated and described will produce the advantages herein set forth in this specification, and I do not wish to be limited to details beyond those recited in the following claims.

An important feature of the present invention is the accessibility of the moving parts of this engine from within the casing when the shafts are removed as above suggested, and from the sides of the casing at all times by withdrawing or removing the heads 12. The latter operation of course exposes the outer ends of the cylinders, the piston and valve heads, and the valve seats; and the inner ends of the cylinders as well as the caps at the inner ends of the valve stems are exposed from the interior of the casing. By removing said caps the valves can be drawn out for grinding, repair, or substitution. When it is necessary to remove a piston, the two sides of the yoke are disconnetced as above described, two opposed pistons turned until the respective sides of their yokes stand at right angles to each other as dotted in Fig. 3, and one piston moved outward to the extreme within its cylinder when the other piston may be moved inward until its head comes out of its own cylinder, and then lifted out of the casing.

If it be desired to remove the crank shaft without taking the pistons out of the casing, the arches 43' at the upper end of the yoke are detached by removing the bolts 45' which are easily accessible when the top plate is withdrawn, and the crank shaft and both the cam shafts may be lifted out in a manner already described and without disarranging the connection of any pair of opposed pistons. The wheels 53 and their roller bearings come out with the main shaft at this time, because the removal of the arches uncovers the upper end of the track on which these wheels travel.

What is claimed as new is:

In an internal combustion engine, the combination with opposed cylinders, pistons therein, a main shaft whose cranks stand between relatively opposite pistons, and a sleeve fast on its crank; of an upright loop-shaped yoke connecting the stem of each pair of pistons and made of an arched top, upright sides whose inner faces are cut away at their respectively opposite edges to leave tracks along their remaining edges, and means for connecting the lower end of their sides and the extremities of the top to the upper end of the track, and on each sleeve two bearings including channeled ring-shaped inner members disposed side by side on the sleeves, balls in their respective channels, and channeled outer members surrounding said balls and constituting wheels, each traveling on one of said tracks within the yoke as the latter reciprocates during the rotation of the crank.

In testimony whereof I affix my signature.

PAUL FELIX.